(12) United States Patent
Rhodes

(10) Patent No.: US 12,272,465 B2
(45) Date of Patent: Apr. 8, 2025

(54) QUICK CONNECT VALVE TESTING AND TUNE-UP SETUP FOR VALVES AT A NUCLEAR POWER PLANT

(71) Applicant: Michael Rhodes, Richland, WA (US)

(72) Inventor: Michael Rhodes, Richland, WA (US)

( * ) Notice: Subject to any disclaimer, the term of this patent is extended or adjusted under 35 U.S.C. 154(b) by 0 days.

(21) Appl. No.: 16/412,350

(22) Filed: May 14, 2019

(65) Prior Publication Data
US 2024/0274307 A1    Aug. 15, 2024

(51) Int. Cl.
*G21C 17/017* (2006.01)
*F16K 37/00* (2006.01)
*F16L 37/00* (2006.01)

(52) U.S. Cl.
CPC ........ *G21C 17/017* (2013.01); *F16K 37/0083* (2013.01); *F16L 37/00* (2013.01)

(58) Field of Classification Search
CPC ..... G21C 17/017; F16K 37/0083; F16L 37/00
USPC ......... 137/559, 315.07, 599.02, 614.06, 798, 137/799, 68.14; 285/33, 148.3, 148.21, 285/148.2, 223
See application file for complete search history.

(56) References Cited

U.S. PATENT DOCUMENTS

| | | | | |
|---|---|---|---|---|
| 2,901,008 A * | 8/1959 | Cavett | ............... | B61C 17/02 105/62.1 |
| 3,490,491 A * | 1/1970 | Kopaska | ............... | F16L 37/33 137/614.05 |
| 3,664,634 A * | 5/1972 | Guertin | ............... | F16L 37/36 251/333 |
| 4,899,792 A * | 2/1990 | Podgers | ............... | B67D 7/42 285/272 |
| 5,396,927 A * | 3/1995 | Marshall | ............... | F16L 37/36 251/356 |
| 5,407,175 A * | 4/1995 | Roberts | ............... | F16L 29/04 285/414 |
| 5,640,990 A * | 6/1997 | Rodriguez | ............... | F16K 17/40 137/68.14 |
| 5,803,510 A * | 9/1998 | Dorsey, III | ............... | A61M 1/774 604/533 |
| 5,899,225 A * | 5/1999 | Yokogi | ............... | F17C 13/04 137/551 |
| 5,997,047 A * | 12/1999 | Pimentel | ............... | F16L 11/18 285/55 |
| 2008/0095574 A1* | 4/2008 | Chang | ............... | F16B 2/22 403/232.1 |
| 2011/0001317 A1* | 1/2011 | Chang | ............... | A61M 1/86 285/148.2 |

* cited by examiner

*Primary Examiner* — Minh Q Le
(74) *Attorney, Agent, or Firm* — Gravis Law, PLLC; Stephen S. Zimowski

(57) ABSTRACT

The A Quick Connect Valve Testing and Tune-up Setup for Valves at a Nuclear Power Plant Claim 1. A Quick Connect Valve Testing and Tune-up Setup for Valves at a Nuclear Power Plant comprises a permanent on/off valve and compression fitting setup proximal a valves input or outputs for valves which required periodic calibration, testing or tune-up. The permanent setup eliminates the disconnecting and damaging removal of existing tubing connections at the valve when calibration, testing or tune-up is performed.

2 Claims, 5 Drawing Sheets

Figure 1:
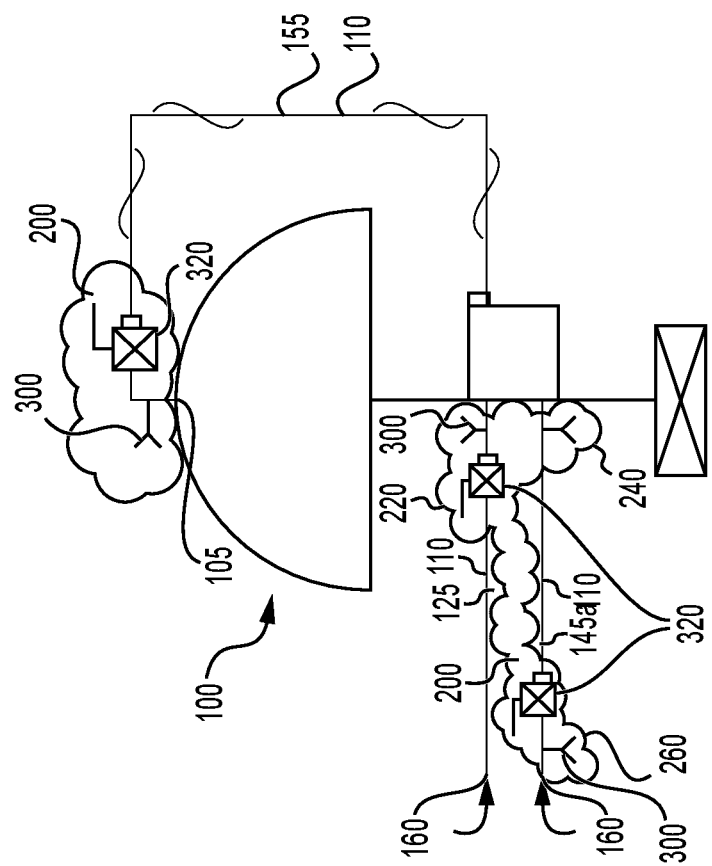

QUICK CONNECT VALVE TESTING AND TUNE-UP SETUP FOR VALVES AT A NUCLEAR POWER PLANT

FIELD OF THE INVENTION

A setup for calibration, testing and tuning up valves at a Nuclear Power Plant.

BACKGROUND OF THE INVENTION

At Nuclear Power Plants valves are involved with fluid flow and passage as necessary for plant operations. Tubing, generally copper tubing, connects valves for control and monitoring. When tubing is initially installed at a valve, it is precisely bent to lineup perfectly between two connections. To verify a perfect fit, the fittings will easily engage the threads and fully seat by hand. Once properly tightened, the tubing and fittings can maintain leak free service for many years in an undisturbed location.

When valve service is needed tubing must be removed in order to connect testing connections. When the tubing is properly removed, safely stored and correctly reinstalled it could last numerous service intervals as long as the original shape is maintained. Generally speaking, the long runs of copper tubing from the instrument racks to the valves are not the primary concern. These runs of tubing are stable and generally protected within a support structure.

The area of concern is the exposed section of tubing between the valve and the end run of its associated support structure. This section of tubing is subject to abuse and damage simply due to its exposure. This invention involves the section of tubing between the valve and the end run. This is valve testing setup for the purpose of reducing damage of this section of tubing during calibration, testing and tuning up valves at a Nuclear Power Plant.

Tubing in this section is subject to being bent out of its original shape from impacts, foot traffic and physical manipulations to accommodate scaffolding or other work in the surrounding area. When the original shape of the tubing is lost, the service life of the fittings and the tubing is greatly reduced. The abuse commonly experienced with tubing damage includes fretting, fitting failure, fitting fatigue, leaks, manipulation and improper installation. Damage occurring causes tubing to loses its original shape. Damage also results from tubing being continually removed and reinstalled to support valve testing and maintenance.

SUMMARY OF THE INVENTION

Reducing the likelihood of damage to tubing and other components including valves is an objective of this quick connect valve testing and tune-up setup invention. Also an objective of this quick connect invention setup is to maximize component tune-ups and diagnostic testing efficiency while expanding the test equipment capabilities to capture real-time loop performance data and instrument rack/supply tubing integrity.

The majority of tubing that supplies air to valves is copper. Although rigid and durable, it takes a beating and is subject to fretting. Another purpose of the quick connect valve test setup is to eliminate the need to disconnect permanent installed tubing and configure and reconfigure temporary tubing for the purpose of calibrations, diagnostic testing and loop checks. Additional benefits of this quick connect setup include expedited set-up time. Valve tests at Nuclear Power Plants typically provide standardized valve test configuration which requires construction of individual "test rigs". A typical Diagnostic tune-up has historically been allotted 12-18 hours. With this quick connect setup invention the time expected for valve testing will be reduced by about one-half. The decreased time also results in reduction of the consumption of other resources and dose experience by technicians.

The need to reconfigure for "Pressure decay" and "live display" testing is eliminated which would otherwise require technician time of thirty to 60 minutes per test. Transducers will be fitted with quick connect adapters. Supply air will be made available with quick connect fittings. This invention will eliminate the need to continually send an individual out to manipulate the supply isolation valve. For diagnostic PMT's, the IR iso valve will never have to be manipulated in most cases.

Total Loop Validation, Loop Cal Credit, with minimal support from I&C, with this setup will realize that data can be captured from the controller to validate the valve response as well as the calibration of the plant installed I/P as dictated from Instrument Master Data Sheets (IMDS). This would be performed immediately following AL testing and eliminate the need for a separate loop cal, thus freeing up resources and schedule burden.

This setup will result in expedited restoration time. With the setup installed, fittings and tubing are no longer disturbed and are no longer subject to galling, wear and damage associated typical tubing removal and installation. Fittings wear out over time from continual removal and installation. Replacement of fittings can add 0.5-2 hours depending on availability, location, etc.

A typical new installation for this setup can take from 2-6 hours depending on skill level and complexity of the configuration. Setup Configuration Control will involve valve and quick connect fitting selection. Isolation valves come equipped with spring latched/locking handles to prevent accidental/unintentional' closing. Work Order Instructions will provide sign-off steps to insure iso valves are restored to the open position and locked prior to PMT. The installed equipment would now be considered non-intrusive with the valves open and locked. Isolation valve handles are color coded for function. Color coding for AOV diagnostic testing is an established Industry wide practice as follows: Red indicates Supply, Yellow indicates i/p signal, Green indicates Diaphragm (Top), and Blue indicates Bottom (Cylinder).

BRIEF DESCRIPTION OF THE FIGS.

FIG. 1 illustrates a valve (100) without the present valve calibration, testing and tune-up setup. The illustration shows diaphragm air (105), control air (120), supply air (140) and output air (150) with rigid tubing indicated by hash marks //.

Figure 2:
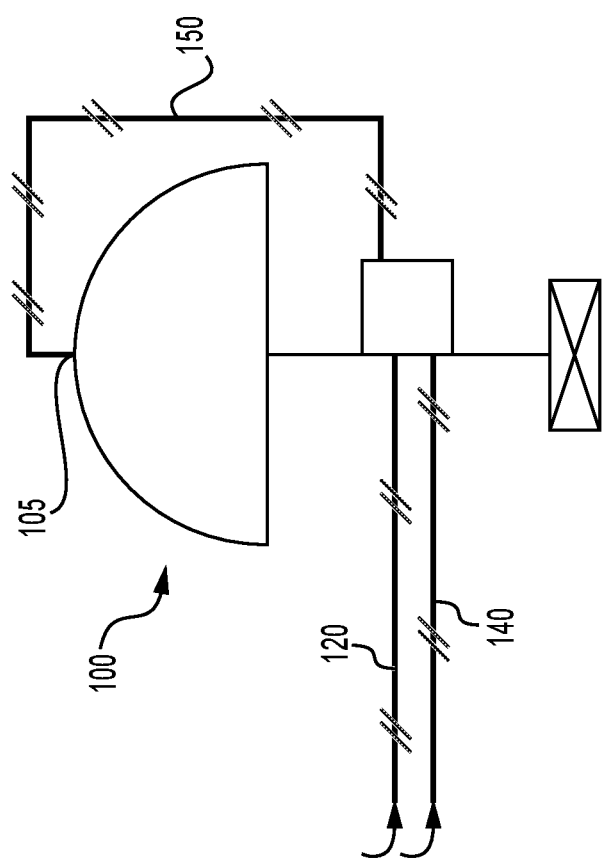

FIG. 2 illustrates a valve (100) with the present valve calibration, testing and tune-up setup. Illustrated is diaphragm air (105), control air (125), output air (155) with flex tubing indicated by curvy marks. Valve setups of this invention are shown at setup 1 (200) for diaphragm air (105), setup 2 (220) for control air (125), setup 3 (240) and setup 4 (260) for supply air (145).

Figure 3:
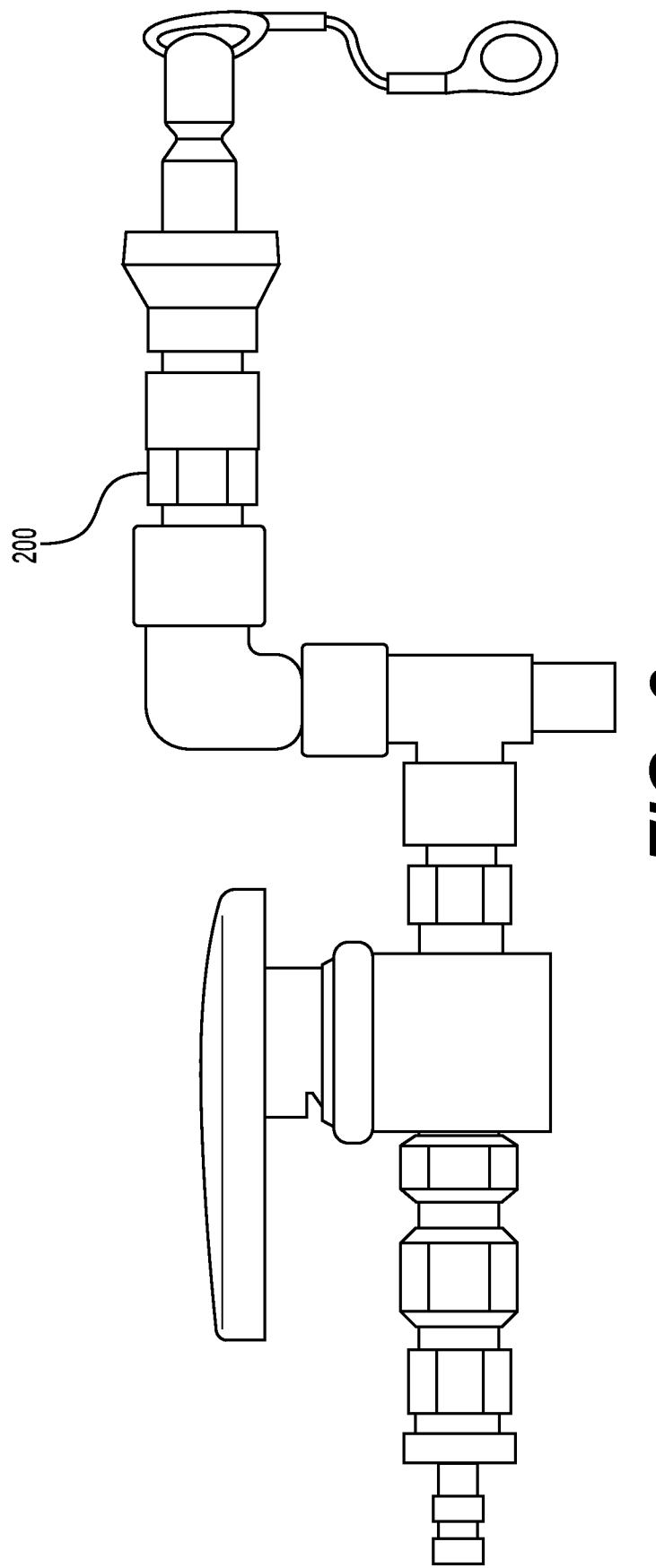
Figure 4:
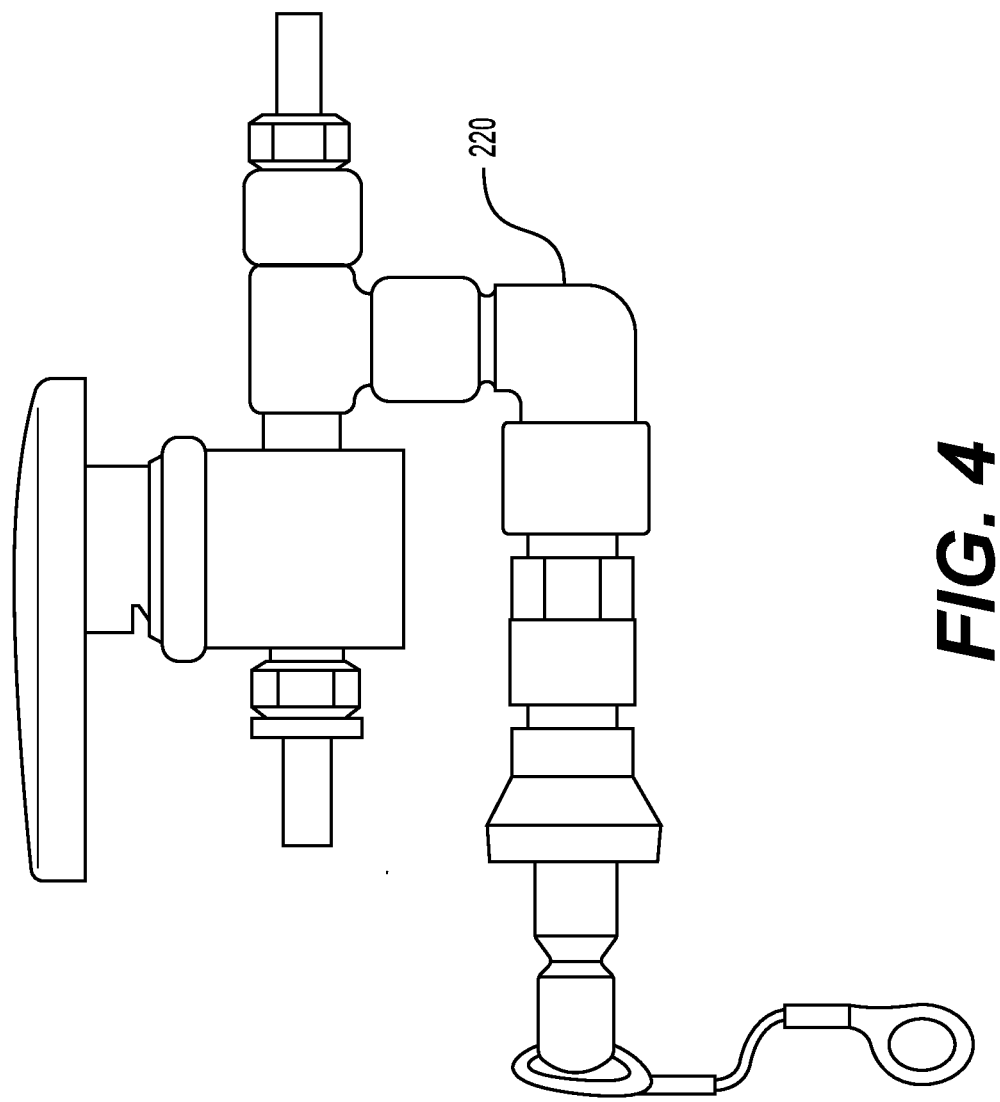
Figure 5:
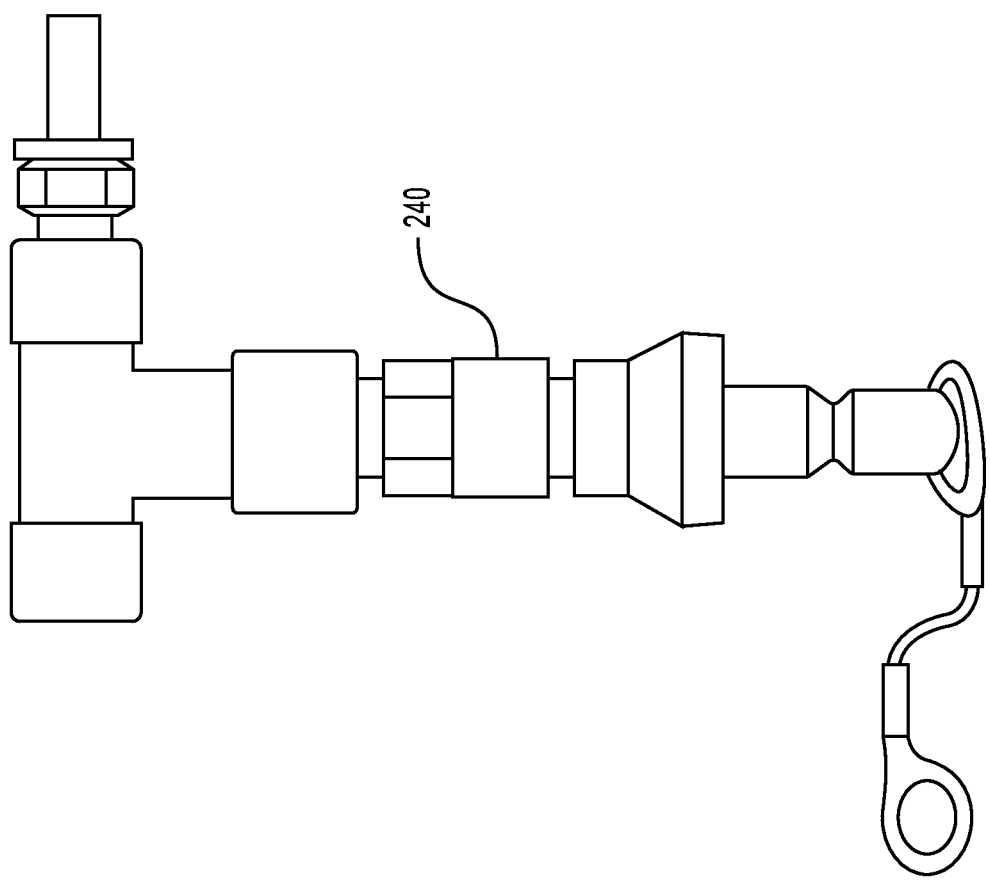
Figure 6:
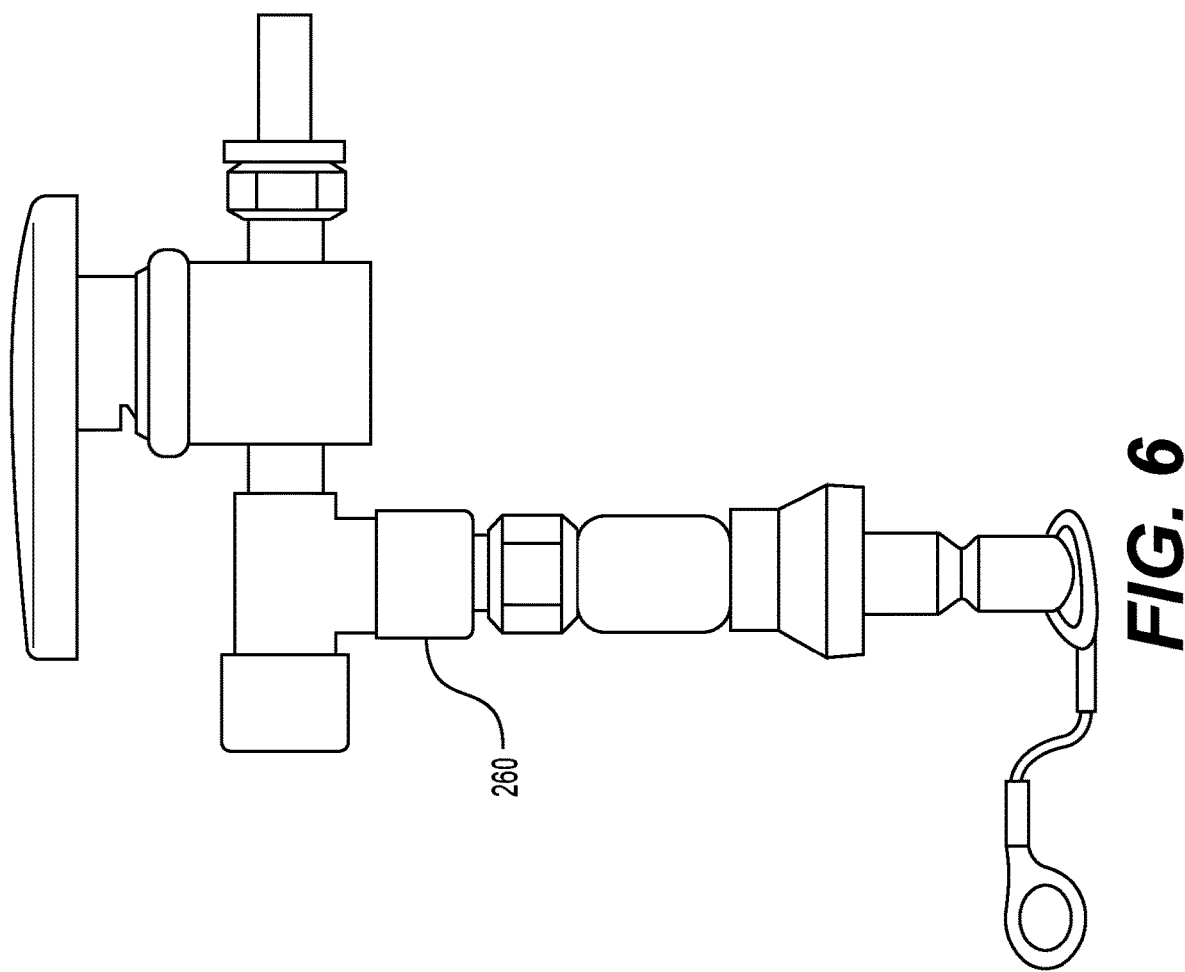

FIG. 3 illustrates the preferred valve setup 1 (200).
FIG. 4 illustrates the preferred valve setup 2 (220).
FIG. 5 illustrates the preferred valve setup 3 (240).
FIG. 6 illustrates the preferred valve setup 4 (260).

DETAILED DESCRIPTION OF THE INVENTION

Illustrated in FIG. 2A is the Quick Connect Valve Testing and Tune-up Setup for Valves at a Nuclear Power Plant. In tubing connecting at each valve input or output which supplies a pressure or flow or other fluid action and where valve (100) operation requiring calibration, testing or tune-up, is the installation of flexible tubing (110) proximal each of the valve (100) inputs or outputs involved with calibration, testing or tune-up. At least one on/off valve (320) installed in each flexible tubing (110) proximal the valve (100) input or output. Intermediate the at least one on/off valve (320) and the valve (100) input or output is the installation of at least one quick connect fitting (300).

As seen in FIG. 2, compression fittings (160) interfaces rigid tubing with flexible tubing is noted for control air (125) and supply air (145) intermediate the compression fittings (160) and the valve (100) input or output. Flexible tubing (110) is noted for output air (155) between a valve (100) input or output and diaphragm air (105).

For diaphragm air (105) at least one setup 1 (200) intermediate diaphragm (105) and the valve (100) input or output.

For control air (125), intermediate compression fitting (160) and a valve (100) input or output is at least one setup 2 (220).

For supply air (145), intermediate compression fitting (160) and a valve (100) input or output is at least one setup 3 (240) and at least one setup 4 (260).

The invention claimed is:

1. A Quick Connect Valve Testing and Tune-up Setup for Valves at a Nuclear Power Plant comprising:

valves (100) having periodic calibration, testing or tune-up have tubing connecting at each valve (100) input or output which provides a pressure or flow or other fluid action involved in the periodic calibration, testing or tune-up, the installation of flexible tubing (110) proximal each valve (100) input or output involved with the calibration, testing or tune-up; and at least one on/off valve (320) installed in the flexible tubing (110) proximal the valve (100) input or output; and intermediate the at least one on/off valve (320) and the valve (100) input or output the installation of at least one quick connect fitting (300); and valve (100) inputs or outputs requiring periodic calibration, testing or tune-ups include valve inputs or outputs for diaphragm air (105), for control air (125) and for supply air (145); and for diaphragm air (105) a setup 1 (200) intermediate diaphragm air (105) and the valve (100) input or output; for control air (125) a compression fitting (160) terminating the flexible tubing (110) and a setup 2 (220) intermediate the compression fitting (160) and the valve (100) inputs or outputs; for supply air (145) a setup 3 (260) and a setup 4 (240);

for supply air (145), a compression fitting (160) terminating the flexible tubing (110), intermediate the compression fitting (160) and a valve (100) input or output is at least one setup 3 (240) and at least one setup 4 (260).

2. A valve setup depending from claim 1 and further comprising:

for diaphragm air (105) setup 1 (200) has a quick connect (300) proximal diaphragm air (105) and an on/off valve distal to both the quick connect (300) and diaphragm air (105);

for control air (125) setup 2 (220) has an on/off valve (320) distal to the valve (100) input or output and a quick connect (300) intermediate the on/off valve (320) and the valve (100) input or output; and for supply air (145) setup 3 (260) has a quick connect (300) distal to the valve input or output and a valve (320) intermediate the valve (100) input or output and a setup 4 240) having a compression fitting (160) intermediate the on/off valve (320) and the valve (100) input or output.

\* \* \* \* \*